United States Patent
Nakano

(10) Patent No.: US 9,330,343 B2
(45) Date of Patent: May 3, 2016

(54) IMAGE ANALYSIS APPARATUS MOUNTED TO VEHICLE

(71) Applicant: DENSO CORPORATION, Kariya, Aichi-pref. (JP)

(72) Inventor: Hiroki Nakano, Okazaki (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 14/411,112

(22) PCT Filed: Jun. 28, 2013

(86) PCT No.: PCT/JP2013/067817
§ 371 (c)(1),
(2) Date: Dec. 24, 2014

(87) PCT Pub. No.: WO2014/003167
PCT Pub. Date: Jan. 3, 2014

(65) Prior Publication Data
US 2015/0146930 A1 May 28, 2015

(30) Foreign Application Priority Data
Jun. 29, 2012 (JP) ................................. 2012-147001

(51) Int. Cl.
*G06K 9/00* (2006.01)
*G06K 9/62* (2006.01)
*G06T 7/20* (2006.01)

(52) U.S. Cl.
CPC .......... *G06K 9/6262* (2013.01); *G06K 9/00798* (2013.01); *G06K 9/00993* (2013.01);
(Continued)

(58) Field of Classification Search
None
See application file for complete search history.

(56) References Cited

U.S. PATENT DOCUMENTS

| 5,638,116 A | 6/1997 | Shimoura et al. |
| 2001/0016797 A1* | 8/2001 | Ogura et al. .................. 701/301 |

(Continued)

FOREIGN PATENT DOCUMENTS

| JP | H07077431 A | 3/1995 |
| JP | 2002259995 A | 9/2002 |

OTHER PUBLICATIONS

International Search Report (in Japanese with English Translation) for PCT/JP2013/067817, mailed Sep. 17, 2013; ISA/JP.

(Continued)

*Primary Examiner* — Hadi Akhavannik
(74) *Attorney, Agent, or Firm* — Harness, Dickey & Pierce, P.L.C.

(57) ABSTRACT

An image analysis apparatus picks up an image of a region ahead of a vehicle using a camera, and allows a control unit to analyze picked-up image data generated by the camera to learn a focus-of-expansion position. The control unit controls the learning performance as follows. Specifically, the control unit does not start the learning performance for the focus-of-expansion position until a state where a detection value of a vehicle speed exceeds a reference speed exceeds a specified duration of time. When the state where a detection value of a vehicle speed exceeds a reference speed exceeds the specified duration of time, the learning performance for the focus-of-expansion position is started from this time point. The specified duration of time may be determined on the basis of statistics on the durations of simulated runs of the vehicle performed on a chassis dynamometer in a vehicle inspection.

11 Claims, 3 Drawing Sheets

(52) U.S. Cl.
CPC ........ *G06T 7/20* (2013.01); *G06T 2207/20081* (2013.01); *G06T 2207/30252* (2013.01); *G06T 2207/30256* (2013.01)

(56) References Cited

U.S. PATENT DOCUMENTS

| | | | |
|---|---|---|---|
| 2003/0214576 A1* | 11/2003 | Koga | 348/47 |
| 2004/0057600 A1* | 3/2004 | Niwa | B60R 25/104 382/103 |
| 2010/0172542 A1* | 7/2010 | Stein et al. | 382/103 |
| 2012/0182426 A1* | 7/2012 | Fukuda | 348/148 |
| 2012/0308114 A1* | 12/2012 | Othmezouri | G05D 1/0253 382/154 |

OTHER PUBLICATIONS

International Preliminary Report on Patentability (in Japanese with English Translation) for PCT/JP2013/067817, issued Dec. 31, 2014; ISA/JP.

Office Action mailed Sep. 8, 2015 issued in the corresponding JP application No. 2012-147001 in Japanese with English translation.

Office Action mailed Feb. 23, 2016 issued in corresponding Japanese Application No. 2012-147001 with English translation.

* cited by examiner

IMAGE ANALYSIS APPARATUS MOUNTED TO VEHICLE

CROSS REFERENCE TO RELATED APPLICATIONS

This application is a U.S. National Phase Application under 35 U.S.C. 371 of International Application No. PCT/JP2013/067817 filed on Jun. 28, 2013 and published in Japanese as WO 2014/003167 A1 on Jan. 3, 2014. This application is based on and claims the benefit of priority from Japanese Patent Application No. 2012-147001 filed Jun. 29, 2012. The entire disclosures of all of the above applications are incorporated herein by reference.

BACKGROUND

1. Technical Field

The present invention relates to an image analysis apparatus mounted to a vehicle, and in particular to an image analysis apparatus mounted to a vehicle, which performs image analysis based on the position of a focus of expansion.

2. Background Art

Recently, there is provided a system for obtaining various pieces of information regarding running of a vehicle. In such a system, a camera is installed in the vehicle and image data picked up by the camera are used for obtaining the various pieces of information. An example of such a system is disclosed in Patent Literature 1. The system related to Patent Literature 1 is an in-vehicle type system that analyzes picked-up image data obtained from an in-vehicle camera to calculate the position of a focus of expansion (FOE) to thereby estimate a posture of the in-vehicle camera. The focus of expansion refers to a point where a group of parallel lines are concentrated in a perspective drawing method.

According to an in-vehicle system of this type, picked-up image data are analyzed taking account of the posture of the in-vehicle camera. Thus, for example, the system enables calculation of a running state of the vehicle in relation to the road, or a distance to a vehicle running in a forward direction.

Patent Literature 1 JP-A-H07-077431

Technical Problem

For example, in learning a focus-of-expansion position, steep edges in luminance variation are extracted from picked-up image data to estimate a region defined by road division lines (e.g., white lines, Botts' dots, etc.) shown in the picked-up image data. Then, the edges corresponding to the road division lines are linearly approximated to obtain two straight lines, followed by calculating an intersection position of the two straight lines. For example, candidates of the focus of expansion are calculated on the basis of a weighted time average of the intersection position.

For example, probability evaluation is performed for the candidates of the focus of expansion by comparing the candidates with a focus-of-expansion position learned in the past to thereby reject those candidates which have low probability. Then, the candidate that has not been rejected is used as a focus of expansion to thereby learn a focus-of-expansion position. For example, the information of the learned focus-of-expansion position is used in estimating edges that are most probable as road division lines.

A focus-of-expansion position is learned while the vehicle runs. As shown in FIG. 5, when a vehicle is inspected, a vehicle 100 is often placed on a chassis dynamometer 200 to perform a simulated run. In such a vehicle inspection, a focus-of-expansion position may be learned in spite of the fact that the vehicle 100 does not run on a road, and thus error learning of a focus-of-expansion position may occur. For example, when there is a wall 210 ahead of a camera 11, stains on the wall 210, or the shadows cast from nearby constructions onto the wall 210 may be erroneously estimated as road division lines, causing error learning of a focus-of-expansion position.

SUMMARY

In light of such a problem, it is desired to suppress the occurrence of error learning of a focus-of-expansion position in performing a simulated run of a vehicle.

According to a typical example, there is provided an image analysis apparatus mounted to a vehicle. The image analysis apparatus includes a camera, a learning means, a speed detecting means and a controlling means. The camera picks up an image of a region ahead of the vehicle and generates image data that show a picked-up image of the region. The learning means analyzes the image data generated by the camera and learns a focus-of-expansion position. The controlling means allows the learning means to start a performance of learning a focus-of-expansion position on condition that a state where the speed of the vehicle detected by the speed detecting means exceeds a reference speed has continued for not less than a predetermined duration of time.

In the case where a vehicle is subjected a simulated run on a chassis dynamometer such as in a vehicle inspection, there is a low probability that the vehicle is subjected to a simulated run for a long duration of time. In general, a simulated run of a vehicle on a chassis dynamometer is completed in about one minute.

Accordingly, when a learning performance for a focus-of-expansion position is ensured to be started by the learning means on condition that the state where the speed of the vehicle detected by the speed detecting means exceeds a reference speed has continued for not less than a predetermined duration of time, learning of a focus-of-expansion position is suppressed from being performed in a state where the vehicle is subjected to a simulated run on a chassis dynamometer. Thus, error learning of a focus-of-expansion position is suppressed from occurring due to the learning of a focus-of-expansion position in a simulated run of the vehicle.

In the image analysis apparatus, the learning means may be configured to learn a focus-of-expansion position on the basis of an estimation result for road division lines that are shown in image data. Further, the controlling means may be configured to stop the learning performance of the learning means when the speed of the vehicle detected by the speed detecting means has become not more than a reference speed or a learning-performance inhibition speed that is set in advance to a speed lower than the reference speed.

DESCRIPTION OF EMBODIMENTS

Referring to FIGS. 1 to 4, hereinafter is described an embodiment of an image analysis apparatus related to the present invention. The image analysis apparatus related to the invention should not be construed as being limited to the embodiment described below, but may be applied with various modes.

Figure 1:
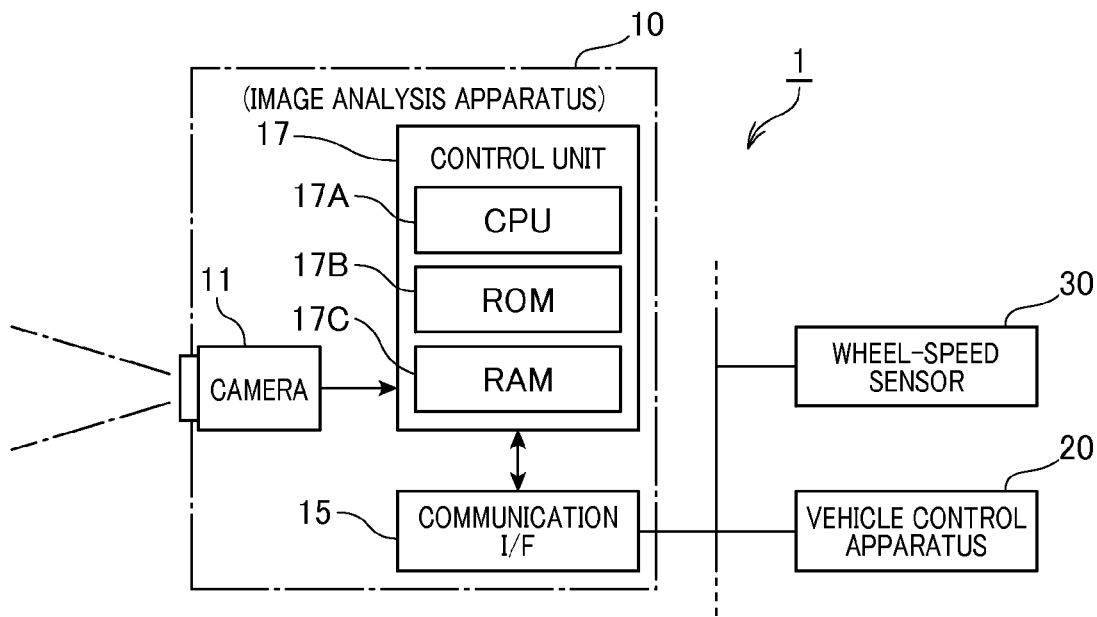
FIG. 1 is a block diagram illustrating a configuration of a vehicle control system provided with an image analysis apparatus related to an embodiment of the present invention.

The image analysis apparatus related to the present invention is implemented being incorporated in a vehicle control system which is mounted to a vehicle. FIG. 1 illustrates a configuration of a vehicle control system 1. As shown in the figure, the vehicle control system 1 includes an image analysis apparatus 10 as an in-vehicle type electronic machine, a vehicle control apparatus 20 and a wheel-speed sensor 30.

In the vehicle control system 1, the image analysis apparatus 10, the vehicle control apparatus 20 and the wheel-speed sensor 30 are individually connected to an in-vehicle network and configured to enable mutual communication. Other than the wheel-speed sensor 30, the in-vehicle network is connected with various sensors (not shown), such as an acceleration sensor, that can detect a running state of the vehicle, in a manner of providing detection values.

The image analysis apparatus 10 includes a camera 11, a communication interface 15 and a control unit 17. The camera 11 picks up an image of a field of view ahead of the vehicle that is equipped with the vehicle control system 1 (so-called own vehicle) to generate picked-up image data as image data that show a picked-up image of the field of view and sequentially input picked-up image data to the control unit 17. In the present embodiment, a monocular camera is used as the camera 11, but a stereo camera may be used instead.

The communication interface 15 is controlled by the control unit 17 and configured to enable two-wary communication with communication nodes, such as the vehicle control apparatus 20 and the wheel-speed sensor 30, via the in-vehicle network.

The control unit 17 carries out overall control of the image analysis apparatus 10. The control unit 17 includes a CPU 17A, a ROM 17B and a RAM 17C. In the control unit 17, the CPU 17A executes various processes according to programs stored in the ROM 17B to thereby realize various functions as the image analysis apparatus 10. The RAM 17C is used as a working memory when the programs are executed by the CPU 17A.

Figure 2:
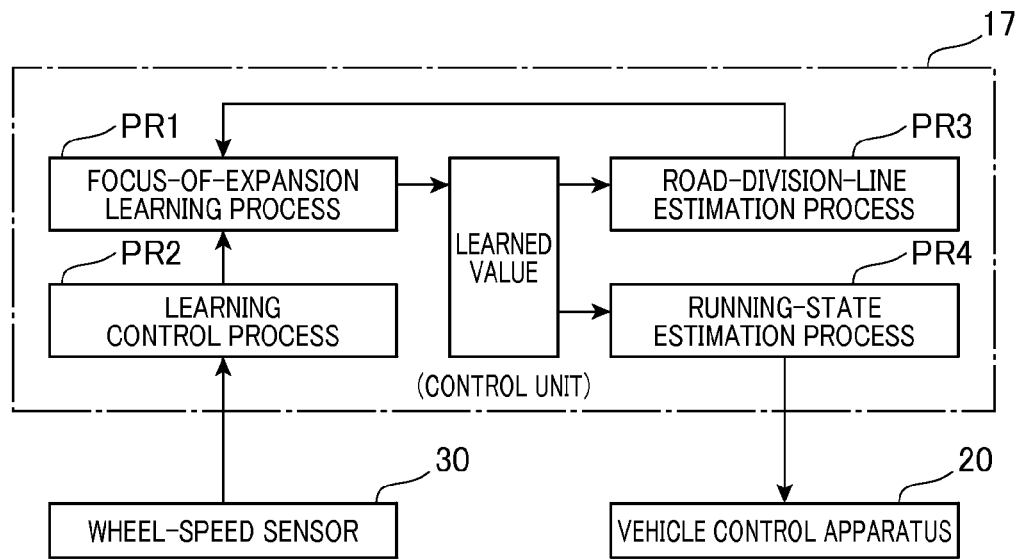
FIG. 2 is a block diagram illustrating a correlation between a plurality of processes performed by a control unit of the image analysis apparatus.

The control unit 17 performs a focus-of-expansion learning process PR1, a learning control process PR2, a road-division-line estimation process PR3, a running-state estimation process PR4, and the like shown in FIG. 2, according to the programs stored in the ROM 17B. The focus-of-expansion learning process PR1 is a process for learning a focus of expansion (FOE) in picked-up image data according to a well-known technique. A learned focus-of-expansion position is stored in the ROM 17B as a parameter indicating a camera posture. For example, the ROM 17B of the present embodiment is configured by an electrically data rewritable flash memory.

Further, the learning control process PR2 is a process for controlling the execution of the focus-of-expansion learning process PR1. The control unit 17 executes the learning control process PR2 to control the start/termination of the focus-of-expansion learning process PR1.

Besides, the road-division-line estimation process PR3 is a process for estimating a region defined by road division lines that are shown in picked-up image data. In the road-division-line estimation process PR3, edges, as candidates of road division lines, are extracted from picked-up image data. Then, based on a positional relationship of the directions of these edges with the learned focus of expansion, edges having a probability of being the road division lines of the road on which the vehicle runs are determined. Thus, the region defined by the road division lines of the road on which the vehicle runs is estimated. If a focus of expansion has not been learned, a focus-of-expansion position calculated from installation parameters of the camera 11, for example, is used as an index to estimate road division lines.

In the focus-of-expansion learning process PR1, a focus-of-expansion position can be learned on the basis of the road division lines estimated through the road-division-line estimation process PR3. For example, an intersection that appears on an extension of two estimated road division lines is detected as a candidate. Then, an error between the position of the detected candidate and the learned focus-of-expansion position is used for the evaluation as to the probability of the candidate's being a focus of expansion. If the error is large and thus the probability is low, the candidate is rejected. If the error is small and thus the probability is high, the candidate is used as a focus of expansion to thereby learn and update the focus-of-expansion position stored in the ROM 17B.

Besides, the running-state estimation process PR4 is a process for analyzing picked-up image data using the learned focus-of-expansion position as an index to estimate a running state of the vehicle in relation to the road, or a positional relationship with a different vehicle running in a forward direction. Since the running-state estimation process PR4 is well known, the process is only briefly described. As an example of the running-state estimation process PR4, there is a process for estimating the direction or position of the vehicle relative to the running lane, on the basis of the road division lines (e.g., white lines or Bott's dots) estimated from picked-up image data. Other than this, as an example of the running-state estimation process PR4, there is a process for retrieving and detecting, with reference to a focus-of-expansion position, a vehicle running in a forward direction and shown in picked-up image data, or estimating a positional relationship with a detected different vehicle in a forward direction (e.g., distance from the vehicle equipped with the system to a vehicle in a forward direction).

Information resulting from the estimation in the running-state estimation process PR4 is provided, for use in vehicle control, to the vehicle control apparatus 20 via the communication interface 15 and the in-vehicle network. The information includes a running state of the vehicle in relation to the road, and a positional relationship with a different vehicle running in a forward direction. The term "vehicle control" here is used in a broad sense as a control over the devices equipped in the vehicle. The vehicle control apparatus 20 can perform the vehicle control based on the information obtained from the image analysis apparatus 10, the vehicle control including, for example: a process of outputting an audible warning to the vehicle occupants when the vehicle crosses road division lines during the run, or when the vehicle approaches a different vehicle in a forward direction; or a process of controlling braking to keep a proper inter-vehicle distance to a vehicle in a forward direction.

Since a learned value of a focus-of-expansion position is used in estimating road division lines or estimating a running state, occurrence of error learning of a focus-of-expansion position is not preferable. However, when focus-of-expansion learning is carried out under the conditions where the vehicle is in a simulated run, being placed on the chassis dynamometer 200 in a vehicle inspection, the camera 11 may pick up an image such as of the stains on the wall 210 ahead of the vehicle or the shadows cast from nearby constructions onto the wall 210. These stains and shadows may induce error learning of a focus-of-expansion position.

Depending on such error learning, a position which is greatly deviated from a truly correct focus-of-expansion position may be learned as a focus-of-expansion position. In the occurrence of such a deviation, the learned value may no longer be restored to a correct focus-of-expansion position through the learning process performed afterward, or a long duration of time may be taken for the restoration.

For example, the road-division-line estimation process PR3 uses the learned value of a focus-of-expansion position. In this case, if the focus-of-expansion position obtained through error learning is used as a basis, it may be difficult to determine correct edges that serve as road division lines. If a correct focus of expansion can be detected as a candidate of a focus of expansion in the focus-of-expansion learning process PR1, the correct focus of expansion cannot be used for learning due to the deviation of the position of the candidate from a learned focus-of-expansion position.

Figure 3:
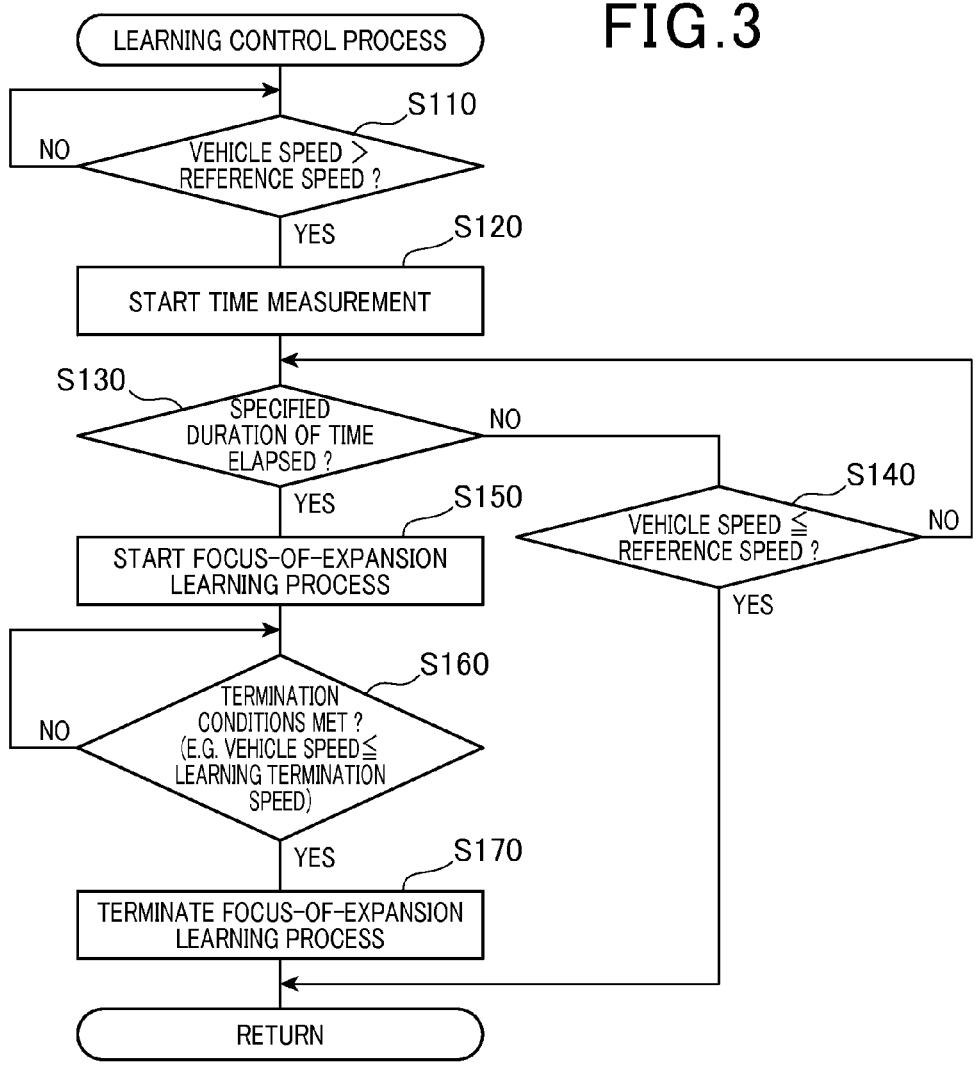
FIG. 3 is a flow chart illustrating a learning control process performed by the control unit.

In this regard, in the present embodiment, a process as shown in FIG. 3 is performed as the learning control process PR2. Thus, under the conditions where the vehicle has a high probability of being in a simulated run, being placed on the chassis dynamometer 200, the focus-of-expansion learning process PR1 is ensured not to be started.

The control unit 17 starts the learning control process PR2 shown in FIG. 3 when the ignition switch is turned on, and repeatedly performs the process until the ignition switch is turned off.

Upon start of the learning control process PR2, the control unit 17 compares a detection value of a vehicle speed with a reference speed set in advance in a design stage. The vehicle speed in this case is derived from the wheel-speed sensor 30 via the in-vehicle network and the communication interface 15. As a result of the comparison, the control unit 17 determines whether or not the detection value of the vehicle speed exceeds the reference value (step S110). It should be noted that the reference speed may be determined by a designer from a view point of whether or not the reference speed enables proper learning of a focus-of-expansion position. The learning of a focus-of-expansion position can be properly performed on a road with good visibility. Accordingly, the reference speed may be set, for example, to about 50 km per hour.

If the detection value of the vehicle speed is determined not to exceed the reference value (No at step S110), the control unit 17 repeatedly performs the determination step until the detection value of the vehicle speed exceeds the reference speed. Then, if the detection value of the vehicle speed is determined to exceed the reference value (Yes at step S110), control proceeds to step S120. Then, from this point, as an original point, onward, measurement of time is started (see FIG. 4).

After that, the control unit 17 determines whether or not the measured time, which is a duration of time elapsed from the execution of step S120, exceeds a specified duration of time (step S130). If the measured time is determined not to exceed the specified duration of time (No at step S130), it is determined whether or not the detection value of the vehicle speed derived from the wheel-speed sensor 30 has been restored to not more than the reference speed (step S140). If it is determined that the detection value of the vehicle speed has not been restored to not more than the reference value (No at step S140), steps S130 and S140 are repeatedly performed until the measured time exceeds the specified duration of time, or until the detection value of the vehicle speed is restored to not more than the reference speed.

Then, when the measured time is determined to exceed the specified duration of time (Yes at step S130), the control unit 17 starts the focus-of-expansion learning process PR1 (step S150). On the other hand, when the detection value of the vehicle speed is determined to have been returned to not more than the reference speed prior to exceeding the specified duration of time (Yes at step S140), the learning control process PR2 is temporarily halted without starting the focus-of-expansion learning process PR1.

An explanation on the specified duration of time is provided below. The specified duration of time is determined by a designer of the image analysis apparatus 10, taking account of the duration of time of the simulated run of the vehicle on the chassis dynamometer 200 in a vehicle inspection. Specifically, if an affirmative determination is made at step S110 during a simulated run of the vehicle on the chassis dynamometer 200, a duration of time based on which an affirmative determination is not made at step S130 during the simulated run is determined to be the specified duration of time.

Specifically, the designer of the image analysis apparatus 10 may keep statistics on the durations of time of simulated runs of the vehicle on the chassis dynamometer 200 in a vehicle inspection, and determine a specified duration of time, so that the probability of making an affirmative determination at step S130 will be sufficiently low in a simulated run of the vehicle on the chassis dynamometer 200. For example, the duration of time of a simulated run on the chassis dynamometer 200 in a vehicle inspection is about one minute. Accordingly, a specified duration of time may be determined to be about two to three minutes.

Figure 4:
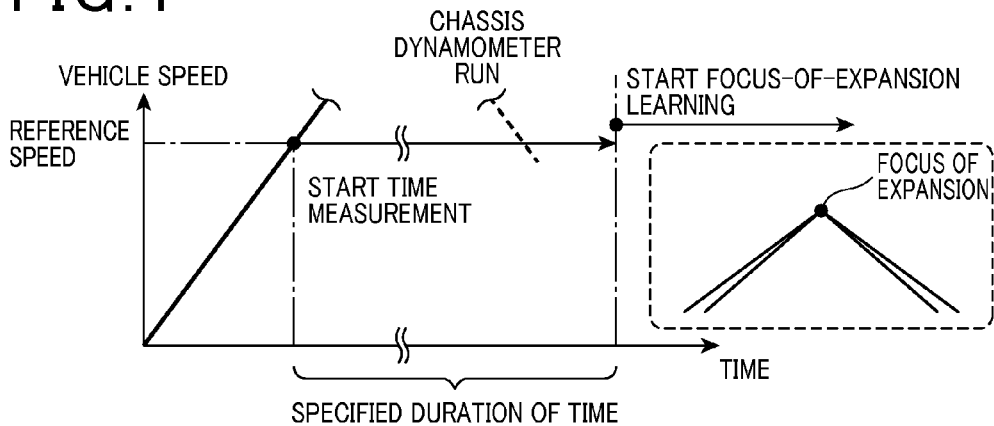
FIG. 4 is a graph explaining operation modes of the control unit, being correlated to vehicle speed.
Figure 5:
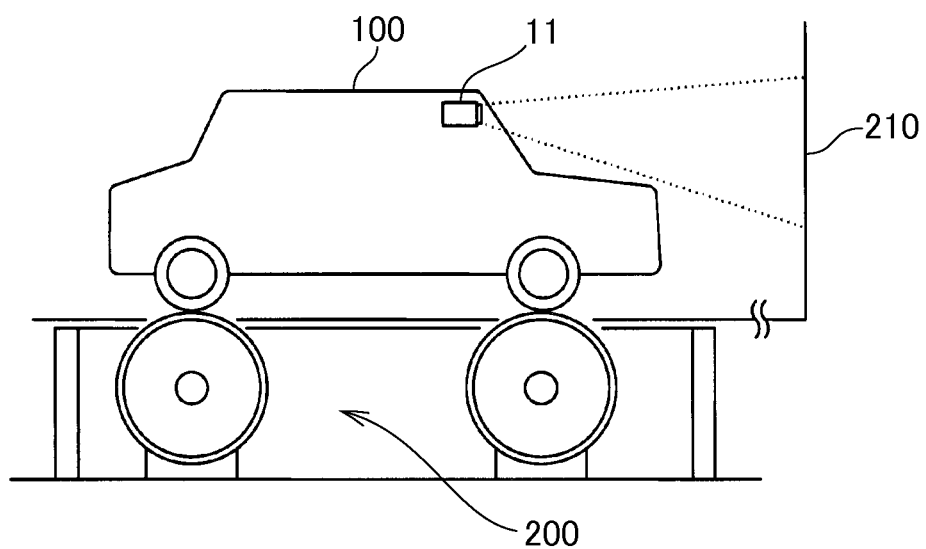
FIG. 5 is a diagram illustrating a state of a vehicle subjected to a simulated run on a chassis dynamometer.

By setting a specified duration of time in this way, it is highly probable that the vehicle speed becomes not more than the reference speed, as indicated by the dashed line in FIG. 4, prior to the excess of an elapsed time over the specified duration of time, the elapsed time being a duration of time from when the vehicle speed has exceeded the reference speed, in a simulated run on the chassis dynamometer 200. Accordingly, an affirmative determination is made at step S140 so that, resultantly, the focus-of-expansion learning process is not started. On the other hand, when the vehicle runs on a road, the focus-of-expansion learning process is resultantly started with a high probability.

When the focus-of-expansion learning process PR1 is started at step S150 under the conditions described above, the control unit 17 determines whether or not termination conditions of the focus-of-expansion learning process PR1 have been met (step S160). At step S160, it is determined whether or not the detection value of the vehicle speed derived from the wheel-speed sensor 30 has become not more than a learning termination speed (e.g., 50 km per hour) determined in advance within a speed range of not more than the reference speed. If the detection value of the vehicle speed is not more than the learning termination speed, the termination conditions may be determined to have been met. If the detection value of the vehicle speed is larger than the learning termination speed, the termination conditions may be determined not to have been met. The termination conditions may be determined by the designer of the image analysis apparatus 10.

Then, when it is determined that the termination conditions have not been met (No at step S160), the control unit 17 repeatedly performs the determination step of S160 until the termination conditions are met. If the termination conditions are determined to have been met (Yes at step S160), the focus-of-expansion learning process PR1 started at step S150 is terminated (step S170) to temporarily halt the learning control process PR2. The control unit 17 repeatedly performs the learning control process PR2 in such a procedure.

The vehicle control system 1 of the present embodiment has so far been described. According to the present embodiment, the camera 11 picks up an image of a region ahead of the vehicle. The camera 11 then produces picked-up image data which are analyzed by the control unit 17 to learn a focus-of-expansion position. Specifically, the learning of the focus-of-expansion position is started on condition that a state where the detection value of the vehicle speed derived from the wheel-speed sensor 30 exceeds the reference speed has continued for a predetermined duration of time or more (step S150).

In a vehicle inspection, for example, there is a low probability that the vehicle is in a simulated run for a long duration of time on a chassis dynamometer. Accordingly, when the focus-of-expansion learning is started under the conditions as provided by the present embodiment, the focus-of-expansion learning can be suppressed from being performed in a state where the vehicle is in a simulated run on a chassis dynamometer. Thus, according to the present embodiment, error learning of a focus-of-expansion position is suppressed from occurring during a simulated run of the vehicle. As a result, the vehicle control and the focus-of-expansion learning performed later are suppressed from being unfavorably influenced by the error learning that would otherwise have occurred.

For example, depending on the focus-of-expansion learning process PR1, a focus-of-expansion position is learned and updated on the basis of the information on the road division lines shown in the picked-up image data estimated through the road-division-line estimation process PR3 and, in estimating road division lines, the information on the learned focus of expansion is used. Accordingly, if the learned focus-of-expansion position is deviated from a correct position by a large degree due to the error learning of the focus-of-expansion position, road division lines can no longer be correctly estimated. In this case, it takes time to learn and update the focus-of-expansion position with a correct value. Further, it may be difficult to learn and update the focus-of-expansion position with a correct value.

According to the present embodiment, the occurrence of such a situation can be suppressed by the control of the learning performance described above. Thus, the vehicle control system 1 formulated accordingly can realize proper vehicle control on the basis of the information on a focus of expansion.

In the case where an affirmative determination is made at step S130, the vehicle is regarded to run on a road in a period from the start of the time measurement at step S120 to an affirmative determination made at step S130. Accordingly, in the focus-of-expansion learning process PR1 started at step S150, the control unit 17 can perform the learning of a focus-of-expansion position by using the information on the road division lines as well which have been estimated from the picked-up image data obtained in a period from the point of execution of step S120 to the affirmative determination made at step S130.

In the foregoing embodiment, the image analysis apparatus 10 corresponds to an example of the electronic machine installed in the vehicle, while the wheel-speed sensor corresponds to an example of the speed detecting means. Further, the focus-of-expansion learning process PR1 performed by the control unit 17 corresponds to an example of the process realized by the learning means. The learning control process PR2 performed by the control unit 17 corresponds to an example of the process realized by the controlling means.

REFERENCE SIGNS LIST

1 . . . Vehicle control system,
10 . . . Image analysis apparatus,
11 . . . Camera,
15 . . . Communication interface,
17 . . . Control unit,
17A . . . CPU,
17B . . . ROM,
17C . . . RAM,
20 . . . Vehicle control apparatus,
30 . . . Wheel-speed sensor,
100 . . . Vehicle,
200 . . . Chassis dynamometer,
210 . . . Wall

What is claimed is:

1. An image analysis apparatus mounted to a vehicle, comprising:
a camera that picks up an image of a region ahead of a vehicle and generates image data that indicates a picked-up image of the region;
means for analyzing the image data generated by the camera and learning a position of a focus of expansion;
means for detecting a speed of the vehicle;
first means for determining whether or not a state where the speed of the vehicle detected by the detecting means exceeds a reference speed has continued for a predetermined duration of time; and
means for allowing the analyzing means to start a performance of learning a position of the focus of expansion, when the first determining means determines that the state where the speed of the vehicle exceeds the reference speed has continued for the predetermined duration of time.

2. The image analysis apparatus according to claim 1, wherein the analyzing means learns a position of the focus of expansion on the basis of an estimation result for road division lines shown in the image data.

3. The image analysis apparatus according to claim 2, wherein:
the apparatus comprises second means for determining, after start of the learning performance for the position of the focus of expansion by the analyzing means, whether or not the speed of the vehicle detected by the detecting means has become not more than the reference speed or a learning-performance inhibition speed that is set in advance to a speed lower than the reference speed; and
the allowing means stops the learning performance of the analyzing means when the second determining means determines that the speed of the vehicle has become not more than the inhibition speed.

4. The image analysis apparatus according to claim 1, wherein:
the apparatus comprises second means for determining, after start of the learning performance for the position of the focus of expansion by the analyzing means, whether or not the speed of the vehicle detected by the detecting means has become not more than the reference speed or a learning-performance inhibition speed that is set in advance to a speed lower than the reference speed; and
the allowing means stops the learning performance of the analyzing means when the second determining means determines that the speed of the vehicle has become not more than the inhibition speed.

5. An image analysis method, comprising:
  picking up an image of a region ahead of a vehicle to generate image data that indicates a picked-up image of the region;
  analyzing the generated image data to learn a position of a focus of expansion;
  detecting a speed of the vehicle;
  determining whether or not a state where a detected speed of the vehicle exceeds a reference speed has continued for a predetermined duration of time; and
  starting a performance of learning a position of the focus of expansion when a state where the speed of the vehicle exceeds the reference speed is determined to have continued for the predetermined duration of time.

6. The image analysis apparatus according to claim 1, wherein the predetermined duration of time is greater than a duration of time of a simulated run of the vehicle on a chassis dynamometer in a vehicle inspection.

7. The image analysis apparatus according to claim 1, wherein the predetermined duration of time is at least one minute.

8. The image analysis apparatus according to claim 1, wherein the predetermined duration of time is greater than ten seconds.

9. The image analysis apparatus according to claim 5, wherein the predetermined duration of time is greater than a duration of time of a simulated run of the vehicle on a chassis dynamometer in a vehicle inspection.

10. The image analysis apparatus according to claim 5, wherein the predetermined duration of time is at least one minute.

11. The image analysis apparatus according to claim 5, wherein the predetermined duration of time is greater than ten seconds.

* * * * *